United States Patent [19]
Fukase et al.
[11] 3,988,583
[45] Oct. 26, 1976

[54] ELECTROSTATIC IMAGING PROCESS USING X-RAYS

[75] Inventors: Masahiro Fukase; Fumio Iwai; Junichi Koiso; Yoichi Ishii, all of Hino, Japan

[73] Assignee: Konishiroku Photo Industry, Tokyo, Japan

[22] Filed: Mar. 18, 1975

[21] Appl. No.: 559,652

[30] Foreign Application Priority Data

Mar. 19, 1974 Japan .............................. 49-31669

[52] U.S. Cl. ......................... 250/315 A; 250/315 R
[51] Int. Cl.[2] ........................................ G03B 41/16
[58] Field of Search ................ 250/315, 315 A, 336

[56] References Cited

UNITED STATES PATENTS 3,873,833 3/1975 Allan et al. .................... 250/315 A

*Primary Examiner*—Alfred E. Smith
*Assistant Examiner*—Bruce C. Anderson
*Attorney, Agent, or Firm*—Haseltine, Lake & Waters

[57] ABSTRACT

A process of producing an electrostatic photographic image by means of X-rays, comprising applying a voltage across two electrodes disposed in opposed parallel relationship, one of the electrodes having a layer of an insulating material on the side thereof facing the other electrode, the space between the insulating layer and the other electrode being filled with an electron or ion emitting liquid. The electrons or ions are generated in the liquid by subjecting the latter to imagewise exposure with X-rays and the electrons or ions are absorbed on the surface of the insulating layer to form an electrostatic latent image. The latent image is then developed with ionized toner to render the same visible.

6 Claims, 3 Drawing Figures

ELECTROSTATIC IMAGING PROCESS USING X-RAYS

This invention relates to a process of producing an electrostatic photographic image of excellent quality by means of X-ray, comprising the steps of applying a voltage by means of a d.c. power supply across two electrodes disposed in opposed parallel relationship, one of said electrodes having a layer of an insulating material on the side thereof facing to the other electrode, said insulating layer being adapted to receive electrons or ions, the space between said insulating layer and said other electrode being filled with a liquid capable of emitting electrons or ions, permitting electrons or ions to generate in said liquid by subjecting the latter to imagewise exposure with X-rays, holding the electrons and ions on the insulating layer so as to form an electrostatic latent image and thereafter developing the electrostatic latent image with ionized toner to obtain a visible image.

Figure 1:
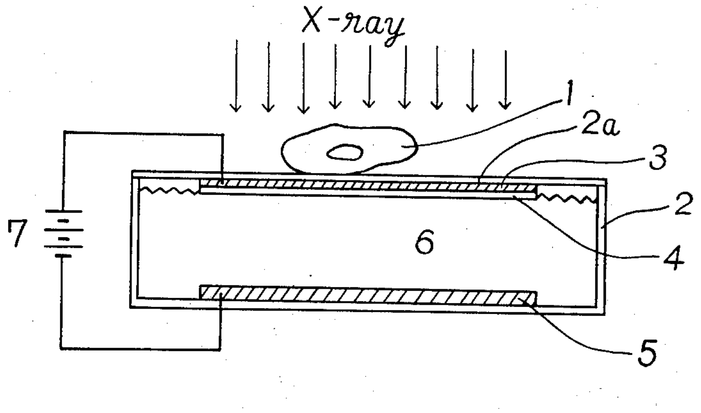
Figure 2:
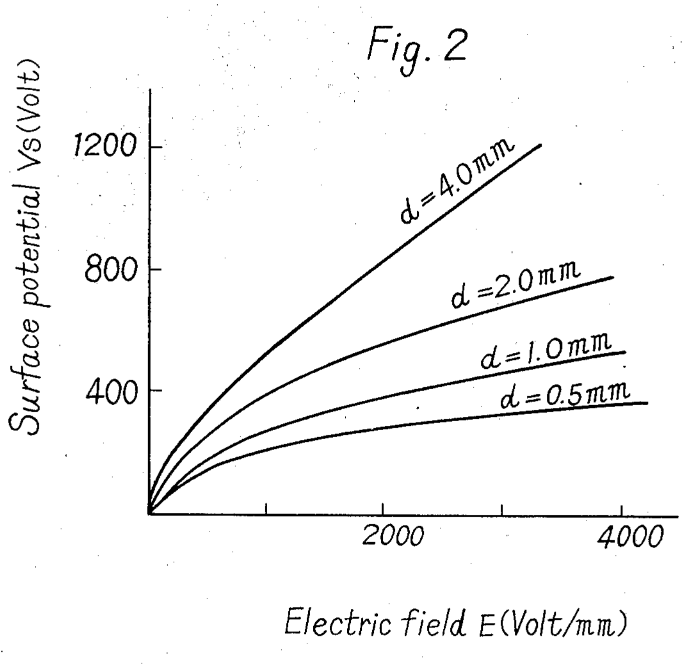
Figure 3:
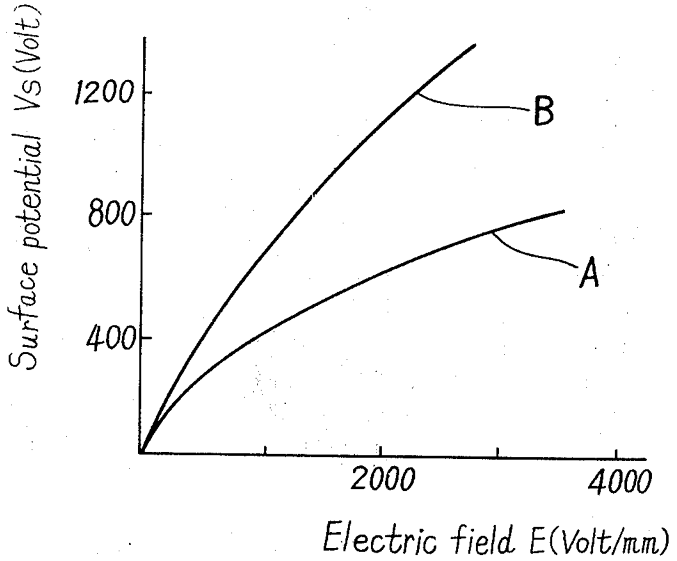

The present invention will now be described in detail hereinbelow with reference to the accompanying drawings, in which;

FIG. 1 is an explanatory view of the device and process according to the present invention, FIG. 2 is a graph showing the relationship between an electric field E and surface potential V*s* of a charge receiving layer when the distance *d* between the electrodes is taken as a parameter and a predetermined amount of X-rays is radiated, and FIG. 3 is a graph showing the relationship between the electric field E and the surface potential V*s* when the distance *d* between the electrodes and the amount of X-ray radiation are kept respectively at a constant value and liquid A or B is used.

Reference numeral 1 denotes an object to be roentgenographed, and numeral 2 a vessel for accomodating a liquid between two electrodes. In particular, a plate 2*a* for supporting the object 1 is formed by a material having a surface with a lesser property of X-ray absorption, for example, acrylic resin, and the object 1 is subjected to exposure with X-rays. On the back side of the plate 2*a* there is formed an electroconductive thin film 3 of beryllium, aluminum or the like having a low X-ray absorption coefficient to be used as an electrode. Further, on the electrode 3 there is formed an insulating layer 4 made of a material such as polyethylene terephthalate. Another electrode 5 is disposed in parallel relationship to the electrode 3. A liquid 6 is filled within the space between the electrodes 3 and 5. A predetermined voltage is applied across the electrodes 3 and 5 by means of a d.c. power supply 7. The electrode 5 is preferably to serve as a photoemitter rather than a mere cathode and is constituted by $Pb_3O_4$, PbO.

In order to obtain an electrostatic photographic image with exposure to X-ray by means of such device, the object 1 to be roentgenographed is at first placed on the supporting plate 2*a* and the object 1 is subjected to exposure with X-rays. The X-rays having passed through the object 1 pass through the supporting plate 2*a*, the electrode 3 and the insulating layer 4 in turn into the liquid 6 within the vessel 2. When the X-rays have reached the liquid 6, electrons or ions are generated in the liquid by exposure with X-rays. At that time, if a voltage as shown in FIG. 2 is applied to the electrodes, the generated electrons or ions move upwards by the effect of the electric field and reach the surface of the insulating layer 4 and are adsorbed thereon to form an electrostatic latent image. If the amount of X-ray radiation is decreased, the number of electrons or ions generated in the liquid is reduced. Thus, the number of electrons or ions generated in the liquid depends on the amount of the X-ray radiation, and therefore the ions adsorbed on the layer 4 can form an electrostatic latent image corresponding to the object to be roentgenographed.

The insulating layer 4 bearing an electrostatic latent image is taken out from the device and developed by a positively charged toner to obtain a negative image. When the layer 4 is developed by a negatively charged toner, a positive image is obtained. The development is carried out according to the previously known powder cloud developing process or the liquid developing process, as well known in electrophotography.

We have made the following experiments.

When the distance *d* between the electrodes is taken as a parameter and a predetermined amount of X-ray radiation is radiated, a relationship between the potential V*s* of the electrostatic image generated on the surface of the insulating layer 4 and the electric field E applied across the electrodes is obtained as shown in FIG. 2. FIG. 2 shows the result obtained when 1,1,2-trichloro-1,2,2-trifluoroethane is used as the liquid and the distance *d* between the electrodes is 0.5, 1.0, 2.0 or 4.0 mm.

The surface potential V*s* increases as the distance *d* between the electrodes is increased. Further, the surface potential V*s* increases as the electric field E is increased. This means that it is preferable to increase the electrode distance *d* and the electric field E in order to increase the value of V*s*, and the sensitivity thereof increases at the same time.

An increase in the electrode distance *d* results in an increase in the number of electrons or ions generated per unit area of the liquid in the direction of the incident X-ray radiation so that the amount of the charge adsorbed on the insulating layer is increased. As a result, V*s* and the sensitivity are increased. However, since X-rays are absorbed in the liquid, and the amount of X-rays absorbed therein is reduced as its distance from the insulating layer increases, it is impossible to increase the distance *d* infinitely. The electrode distance wherein the X-ray radiation generates electrons or ions effectively depends on the absorption coefficient of the liquid used. Further, when the distance *d* is increased, the transverse distance of diffusion of the generated electrons or ions when they travel across the electrodes increases, and therefore the resolution of the image is deteriorated and an electrostatic image of excellent quality cannot be obtained. The results of experiments has proved that in order to obtain an electrostatic photographic image of excellent quality, the absorption of X-rays and the distance of diffusion of electrons or ions make it necessary that the electrode distance *d* is limited to 20 mm for any kind of liquid.

When the electric field E is low, the kinetic energy of the electrons or ions generated in the liquid is small so that they are combined again with ions having an opposite polarity before reaching the insulating layer to be converted thereby into neutral molecules, and the amount of the charges accumulated on the insulating layer is reduced. When the electric field E is high, the above-mentioned recombination of the ions is reduced to a negligible extent so that most of the electrons or ions generated in the liquid can reach the insulating layer. Consequently, the value of $V_s$ and the sensitivity will increase. By increasing the electric field E, the transverse diffusion of the electrons or ions travelling across the electrodes is decreased, and the resolution thereof can be improved so that an electrostatic photographic image of more excellent quality can be obtained. However, it cannot be allowed to increase the electric field applied across the electrodes beyond a dielectric breakdown strength which depends on the kind of the liquid used. When an electric field is applied exceeding the dielectric breakdown strength, a discharge takes place extending the whole region of the electrodes irrespective of the radiation of X-rays, and therefore an electrostatic latent image corresponding to the object to be roentgenographed cannot be obtained. Moreover, if such a discharge takes place once, the liquid within the space between the electrodes is decomposed in time, and the product produced by the decomposition contaminates the electrodes and renders the subsequent operation unstable. Therefore, it is undesirable to permit such discharge to take place. For example, the dielectric breakdown strength of 1,1,2-trichloro-1,2,2-trifluoroethane is 12,600 Volt/mm.

It is preferable to apply the electric field E across the electrodes only during the time when X-rays are radiated. As mentioned later, when the electric resistance of the liquid is low, an electric current (which is a current flow when X-rays are not radiated and is referred to as "dark current") flows across the electrodes irrespective of the amount of radiation of X-rays, and the charges are uniformly accumulated on the insulating layer, resulting in an increase in fog. Therefore, it is preferable to shorten the time during which the electric field is applied and completely synchronize it with the time of radiation of X-rays.

FIG. 3 shows the experimental results using different kinds of liquids. This figure represents the relationship between the electric field E and the surface potential E when the electrode distance $d$ and the amount of radiation of X-rays are kept constant respectively. Irrespective of the kind of liquid used, the value of $V_s$ increases as the values of $d$ and E increase. As can be seen clearly from FIG. 3, if the same electric field is used, the values of $V_s$ and sensitivity obtained when carbon tetrachloride (curve B of FIG. 3) is used are higher than those when 1,1,2-trichloro-1,2,2-trifluoroethane (curve A of FIG. 3) is used. This means that a liquid having a larger X-ray absorption coefficient has a higher sensitivity. In calculating absorption coefficients $\mu$ of both the liquids, assuming that the energy of X-ray photon is provisionally set at 40 KeV, $\mu$ of carbon tetrahchloride is 1.61 $cm^{-1}$, and that of 1,1,2-trichloro-1,2,2-trifluoroethane is 1.15 $cm^{-1}$. Therefore, carbon tetrachloroide has a higher absorption coefficient and sensitivity. As described hereinabove, the absorption coefficient of the liquid used is an important factor which decides the sensitivity thereof. The experimental results proved that it is preferable to use a single compound or the mixture of compounds having an absorption coefficient of more than 1.0 $cm^{-1}$ as the liquid.

Further, the volume resistivity of the liquid gives a large influence on the sensitivity thereof. When the volume resistivity of the liquid is low, mere application of the electric field across the electrodes causes electric charges to be evenly distributed on the whole region of the insulating layer irrespective of X-ray radiated area or the non X-ray radiated area. Therefore, when the amount of the charges are greater than that of the charges due to the electrons or ions generated in the liquid in the X-ray radiated area, the electrostatic latent image due to the electrons or ions generated by radiation of X-rays is covered by the charges so that the electrostatic latent image corresponding to the distribution of X-ray strength becomes obscure or blurred. In such a case, it is necessary to increase the amount of X-rays to be radiated than the electric current flow when the electric field is merely applied across the electrodes thereby making the electrostatic latent image clear. Therefore, as the volume resistivity of the liquid is greater, the electrostatic latent image produced by radiation with X-rays becomes more clear so that the amount of radiation of X-rays can be decreased. When an electrostatic latent image is visualized by a toner using a liquid having a low volume resistivity, a great amount of fogging is produced in the electrostatic photographic image obtained, and so an X-ray image of excellent quality cannot be obtained. Further, when the volume resistivity of the liquid is very low, the dark current flow with mere application of the electric field across the electrodes will increase thereby causing the phenomenon of a voltage drop. Therefore, it is not preferable to use such a liquid having a low volume resistivity.

By measuring the volume resistivity of the liquid and taking into consideration the above-mentioned phenomenon, the limit of resistance wherein an X-ray photographic image is obtained was evaluated. As a result, the limit of the resistance was found to be $10^{12}\Omega$cm. A more preferable result is obtained as the volume resistivity is higher. It is necessary for the liquid to have a volume resistivity of more than $10^{12}\Omega$cm. As is well known, if the liquid contains impurities, ions or moisture or the like, the volume resistivity of the liquid generally decreases remarkably. Therefore, a liquid having a high purity treated by dehydration and refining must be used for the purpose.

As is clear from the foregoing, it is desirable to use a liquid having an X-ray absorption coefficient of more than $10^{-1}$ cm and a volume resistivity of more than $10^{12}\Omega$cm.

The representative liquids satisfying these properties includes, in addition to the above-mentioned liquid, liquid elementary halogens and liquid halogenated hydrocarbons. These may be used in combination. For example, liquid elementary halogens include bromine solution, iodine solution and chlorine solution. Halogenated hydrocarbons include carbon tetrachloride, chloroform, trichloroethane, tetrachloroethane, pentachloroethane, trichloroethylene, tetrachloroethylene, methyl bromide, ethyl bromide, ethylene bromide, tetrabromoethane, chlorobromoethane, chlorobenzene, trichlorobenzene, bromobenzene, dibromobenzene, fluorodichloromethane, dichlorodifluoromethane, fluorotrichloromethane, trifluoromonobromoethane. They are illustrative but not limited. It is needless to say that mixtures of these substances can also be used.

As mentioned hereinabove, as the electric field approaches the dielectric breakdown strength, undesirable discharge takes place due to the irregular surface of the electrodes, etc., before the discharge extends uniformly on the whole surface of the electrodes. Such discharge continues for an extended period of time while the electric field is applied across the electrodes. Generally speaking, in the G.M. counter tubes, etc., used for measuring the amount of radio-active rays, a small amount of an organic compound such as alcohol, etc., or a halogen gas such as chlorine, bromine or the like is mixed into the gas into the counter tube for the purpose of automatically extinguishing the discharge which has developed to a certain extent. The halogen gas is called "quenching gas".

However, when the liquid used for the present invention has a quenching effect, it is not necessary to mix a separate quenching liquid. In case of the liquid liable to cause sustained discharge, taking into consideration such phenomenon, the liquid can be mixed with a liquid having a strong quenching effect.

Examples of the present invention will now be described hereinbelow.

EXAMPLE 1

A cathode made of a copper plate 1.0 mm thick and an anode comprised of an acrylic resin plate 1 mm thick on the lower side of which aluminum is vacuum deposited were employed. One surface of polyethylene terephthalate 175 $\mu$ thick as an insulating sheet is rendered electroconductive and then brought into contact with the anode. The space between the other surface of the insulating sheet and the cathode was kept at 2 mm by means of a spacer. 1,1,2-Trichloro-1,2,2-trifluoroethane was filled within the space. Under the conditions of radiation wherein the voltage applied across an X-ray tube is 70 KVP, the tube current is 100 mA. the time for radiation is 0.5 seconds and the distance from the X-ray tube to the object to be roentgenographed is 1 meter, a d.c. voltage of 8,000 Volts was applied across the electrodes while X-rays were radiated. A human hand and a sheet of microchart were used as objects to be roentgenographed and placed on the acrylic resin plate upon the anode. The said X-rays were radiated on the said objects. When the X-rays passed through the surface of polyethylene terephthalate and the outside of the objects, a surface potential of −430 Volts was obtained in the maximum X-ray radiated region. When this electrostatic latent image was visualized by the powder cloud development process, an X-ray photographic image of excellent quality having a maximum density (reflection density) of 2.3 and a resolution of more than 10 lines/mm was obtained.

EXAMPLE 2

The device described in the Example 1 was used, and carbon tetrachloride was employed as the liquid and filled into the space between the electrodes. Under the conditions of radiation wherein the voltage applied across the X-ray tube is 70 KVP, the tube current is 100 mA, the time for radiation is 0.2 seconds and the distance from the X-ray tube to the object to be roentgenographed is 1 meter, a d.c. voltage of 8,000 Volts was applied across the electrodes while X-rays were radiated. A human hand and a sheet of microchart were used as objects to be roentgenographed. When X-rays passed through the surface of polyethylene terephthalate and the outside of the objects, a surface potential of −340 Volt was obtained in the maximum X-ray radiated region. When this electrostatic latent image was visualized by the powder cloud development process, an X-ray photographic image of excellent quality having a maximum transmission density of 2.0 and a resolution of more than 10 lines/mm was obtained.

What we claim is:

1. A process of producing an electrostatic photographic image by means of a radio-active ray, comprising the steps of applying a voltage across two electrodes disposed in opposed parallel relationship, one of said electrodes having a layer of an insulating material on the side thereof facing the other electrode, the space between said insulating layer and said other electrode being filled with an electron- or ion-emitting substance, permitting electrons or ions to generate from said substance by subjecting the latter to imagewise exposure with X-rays, allowing the electrons or ions to be adsorbed on the surface of the insulating layer to form an electrostatic latent image, and then developing said latent image with ionized toner to visualize the same, said electron- or ion-emitting substance being a liquid.

2. A process of producing an electrostatic photographic image by means of a radio-active ray, comprising the steps of applying a voltage across two electrodes disposed in opposed parallel relationship, one of said electrodes having a layer of an insulating material on the side thereof facing the other electrode, the space between said insulating layer and said other electrode being filled with a liquid capable of emitting electrons or ions, permitting electrons or ions to generate in said liquid by subjecting the latter to imagewise exposure with X-rays and allowing the electrons or ions to be adsorbed on the surface of the insulating layer to form an electrostatic latent image, and then developing said latent image with ionized toner to visualize the same, said liquid having an absorption coefficient of at least more than 10 $cm^{-1}$ and a volume resistivity of more than $10^{12}\Omega cm$ when subjected to exposure with X-rays of 40 KeV.

3. A process as claimed in claim 1 wherein said liquid is selected from the group consisting of bromine solution, iodine solution, chlorine solution, carbon tetrachloride, chloroform, trichloroethane, tetrachloroethane, pentachloroethane, trichloroethylene, tetrachloroethylene, methyl bromide, ethyl bromide, ethylene bromide, tetrabromoethane, chlorobromoethane, chlorobenzene, trichlorobenzene, bromobenzene, dibromobenzene, fluorodichloromethane, dichlorodifluoromethane, fluorotrichloromethane and trifluoromonobromoethane, and mixtures thereof.

4. A process as claimed in claim 1, wherein said liquid is used in admixture with a separate quenching liquid.

5. A process as claimed in claim 2 wherein said liquid is selected from the group consisting of bromine solution, iodine solution, chlorine solution, carbon tetrachloride, chloroform, trichloroethane, tetrachloroethane, pentachloroethane, trichloroethylene, tetrachloroethylene, methyl bromide, ethyl bromide, ethylene bromide, tetrabromoethane, chlorobromoethane, chlorobenzene, trichlorobenzene, bromobenzene, dibromobenzene, fluorodichloromethane, dichlorodifluoromethane, fluorotrichloromethane and trifluoromonobromoethane, and mixtures thereof.

6. A process as claimed in claim 2, wherein said liquid is used in admixture with a separate quenching liquid.

* * * * *